United States Patent Office 3,594,469
Patented July 20, 1971

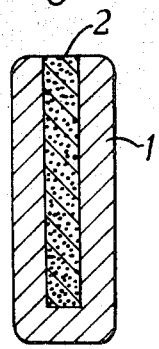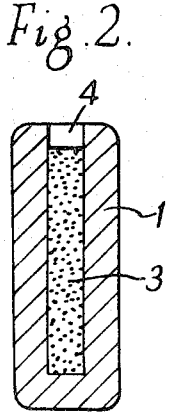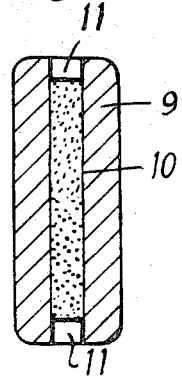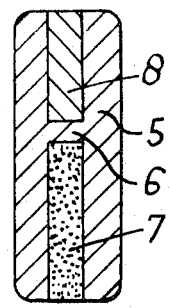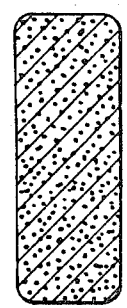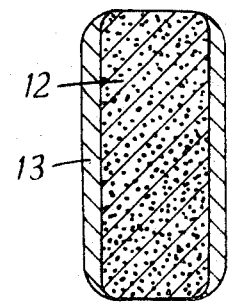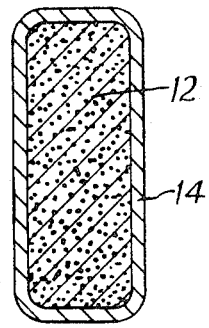

3,594,469
PELLETS FOR SUPPLYING BIOLOGICALLY ACTIVE SUBSTANCES TO RUMINANTS CONTAINING MAGNESIUM AND IRON
Derek James Whitehead and Peter Darien Demaine, Manchester, England, assignors to Pfizer Inc., New York, N.Y.
Filed Nov. 23, 1965, Ser. No. 509,265
Claims priority, application Great Britain, Nov. 30, 1964, 48,589/64
Int. Cl. A61j *3/00, 3/07, 3/08*
U.S. Cl. 424—22                                              13 Claims

ABSTRACT OF THE DISCLOSURE

Pellets for administration to ruminants for supplying the animals over an extended period of time with biologically active substances selected from the group consisting of magnesium and magnesium base alloys, together with particles of a metallic substance non-harmful to ruminants and of a higher specific gravity than that of said biologically active substance, said biologically active substance and said particles being in such proportions that the pellet has a specific gravity of at least 2.2.

---

This invention relates to pellets for supplying predetermined quantities of biologically active substances, e.g. nutritional or therapeutic substances, to ruminants over an extended period of time. The pellets are administered to the animal in such a manner that they remain in the rumeno-reticular sac where it is intended that they should slowly dissolve or corrode and thus supply to the alimentary tract a continuous quantity of the nutritious or therapeutic substance.

An object of this invention is to provide a suitable magnesium-containing pellet for preventing a disease known as hypomagneseamia caused by magnesium deficiency in the diet of cattle and sheep.

In order that the pellets, once introduced into the rumeno-reticular sac, remain there for a considerable period it is necessary that the pellet be of a specific gravity not less than 2.2.

It has been suggested that the specific gravity of the pellets be adapted for the present purpose by the provision of solid steel cores. However, this was thought undesirable since the steel cores would remain in the animal long after the magnesium had dissolved.

Therefore, the pellets should be such that they remain in the animal for an extended period of time and yet are finally entirely passed into the alimentary tract.

A further requirement is that of providing a constant rate of dissolution or emission of the biologically active substance during this extended period. Pellets have been provided hitherto comprising mixtures of materials such as copper oxide and clay, or cobaltic oxide and clay, but these were found not to be entirely satisfactory in that after a while the surface of the pellets became partially or completely sealed by an insoluble film from the fluid in the rumeno-recticular sac.

According to the invention we provide a pellet for administration to ruminants, for retention in the rumeno-reticular sac, for supplying the animals with biologically active substances over an extended period of time, said pellet having at least magnesium or magnesium alloy as the biologically active substance and having a particulate substance of higher specific gravity than that of the magnesium or magnesium alloy, said biologically active substance and particulate substance being in such proportions that the pellet has a specific gravity of at least 2.2. The particulate substance may be powdered iron since it is inexpensive. Other substances may be used such as those to be described later, provided the specific gravity is sufficiently high and that they are harmless to animals.

Constructional forms of the invention will now be described by way of example with reference to the accompanying drawing, said example being illustrated in longitudinal cross-sections:

FIG. 1 shows one form of pellet in which magnesium alloy is an open tube whih contains the particulate material of heavier specific gravity secured by a binder;

FIGS. 2 and 3 show other examples in which the magnesium alloy is in the form of a closed tube;

FIG. 4 shows the pellet having two chambers;

FIG. 5 shows a pellet made of magnesium alloy which contains the particulate material of heavier specific gravity evenly dispersed throughout the alloy.

FIG. 6 shows a pellet as in FIG. 5 partly coated with a water impermeable material; and FIG. 7 shows a pellet as in FIG. 5 with a complete porous coating.

Examples of methods of making pellets in accordance with the invention will now be described:

FIG. 1 shows a cylindrical tube 1 closed at one end cast in a magnesium base alloy. The tube is filled with a particulate substance 2 in the form of steel shot held in position by paraffin wax. The shot may be in lose form 3 as in FIG. 2 and plugged at the open end by a disc 4 of magnesium. Instead of steel shot powdered iron or iron oxide may be used as the filler. The tube 5 may be cast with a dividing wall 6 (see FIG. 4) between its ends whereby two chambers 7, 8 are formed, one (7) for receiving the steel shot and the other (8) for receiving some other biologically active substance such as an antibiotic. The tube 9 of FIG. 3 is extruded and then plugged at both ends by porous discs 11, after filling with shot and other biologically active substance 10, which discs permit gradual egress of said other biologically active substance.

In another method, magnesium of magnesium alloy and iron powders are mixed together and then extruded through a die to form a rod which is subsequently cut up into pellets (see FIG. 5).

Further magnesium or magnesium alloy and iron powders are mixed together with a binder such as resin, starch based binder, paraffin wax, magnesium oxychloride or waterglass and moulded into pellets (see FIG. 5).

The pellets may be made by introducing iron powder, iron shot or steel shot into molten magnesium or magnesium alloy as the latter is cast into a billet produced by a continuous or semi-continuous casting process. The resulting iron-impregnated magnesium is then extruded into pellet form (see FIG. 5).

In another example the iron powder, iron shot or steel shot is introduced into molten magnesium or magnesium alloy to form a paste mixture which is moulded into individual pellets or is extruded as a continuous length and subsequently cut into pellets (FIG. 5). The pellet may be cast or extruded in the form of tubes closed at one end whereby some other biologically active substance such as an antibiotic may be retained.

In any of the above examples the pellets may be provided with a sheath resistant to corrosion such as a plastics material or a resin lacquer whereby a desired portion of the surface of the pellet may be covered so that the rate of corrosion is controlled. In FIG. 6 the pellet 12 is provided over its cylindrical surface with a tenacious impermeable coating 13. Alternatively, as shown in FIG. 7 the pellet 12 may have a water permeable coating 14 over the entire surface of the pellet.

On introduction into the sac the pellets commence corrosion thus producing magnesium chloride and magnesium oxychloride, which being soluble then enter the bloodstream. The corrosion effect tends to prevent the formation of any sealing film from the contents of the rumeno-reticular sac. Furthermore, in the case of the particulate substance being iron powder an electrolytic effect is produced in which hydrogen is given off which assists in the prevention of a sealing film being formed on the pellet surface.

A further advantage of using iron powder is that when mixed with magnesium powder and compressed the resulting pellet is quite hard and can withstand transport and heavy handling without being unduly damaged.

Pellets made in accordance with the above examples are eventually passed into the animal's alimentary tract, the particulate substance being rejected once the latter is dispersed within the sac.

The magnesium base alloy used in the above examples may contain the following elements:

|  | Percent |
|---|---|
| Cobalt | 0–.5 |
| Aluminium | 0–15 |
| Zinc | 0–5 |
| Copper | 0–5 |
| Nickel | 0–1 |

By increasing the proportions of any one or more of Ni, Cu and Co the corrosion rate of the pellet may be increased.

The following amounts in percentage weight are suitable for use with magnesium or magnesium base alloy having a specific gravity of 1.74 to 2.0.

| Substance | Specific gravity | Minimum percent weight of pellet |
|---|---|---|
| Iron powder or shot<br>Steel shot | 7.0–7.86 | 13.9 |

The specific gravity of the pellet should not be less than 2.2 or weigh less than 1 gram otherwise there is a tendency for the pellet to be rejected by the animal. A maximum specific gravity of 3.5 should not be exceeded. A preferred figure is 2.5.

Although iron powder is preferred as the particulate substance the following alternatives are also possible:

| Substance | Specific gravity | Minimum percent weight of pellet |
|---|---|---|
| Iron oxide | 5.2 | 43 |
| Zirconium oxide | 5.7 | 41 |
| Zirconium silicate | 4.6 | 46 |
| Zinc oxide | 5.5 | 42 |

A pellet suitable for administration to a cow may be conveniently 3 inches long by 1 inch in diameter and with domed ends. With a specific gravity of 2.6 using iron powder the weight is about 100 grams. Pellets for cows may be anything up to 6 inches in length. Smaller pellets are provided for sheep. These may be 1½ inches long and from ½ to ¾ inch in diameter.

Powdered materials used in making these pellets should be non-abrasive, or be rendered non-abrasive by the action of digestive processes to avoid damage to the animal's system.

We claim:
1. A pellet of a size suitable for administration to ruminants, for retention in the rumeno-reticular sac, for supplying the ruminants with magnesium over an extended period of time, said pellet containing magnesium and particles of iron or steel, said metallic magnesium and said particles of iron or steel being in such proportions that the pellet has a specific gravity of at least 2.2.

2. A pellet as claimed in claim 1, wherein said particles comprise iron powder.

3. A pellet as claimed in claim 1, wherein said particles comprise iron shot.

4. A pellet as claimed in claim 1, wherein the metallic magnesium is in the form of a tube having at least one open end and said particles of iron or steel are contained in said tube.

5. A pellet as claimed in claim 4, wherein said particles are retained within said tube by paraffin wax.

6. A pellet as claimed in claim 4, wherein said particles are retained within said tube by a plug closing the open end of said tube.

7. A pellet as claimed in claim 4, wherein said tube includes a dividing wall between its ends whereby two chambers are formed, said particles being contained in one of said chambers and the other of said chambers containing an antibiotic.

8. A pellet as claimed in claim 4, wherein said tube is open at both ends and also contains an antibiotic, said tube being plugged at both ends thereof in such a manner to permit gradual egress of said antibiotic contained within said tube.

9. A pellet as claimed in claim 1, in which said magnesium and said iron are each in powder form and the pellet comprises a mixture of said powders.

10. A pellet as claimed in claim 9, in which said mixture also contains a binder selected from the group consisting of paraffin wax, magnesium oxychloride and waterglass.

11. A pellet as claimed in claim 1, comprising a matrix of said magnesium impregnated with said particles.

12. A pellet according to claim 1, in which the metallic magnesium comprises a magnesium alloy.

13. A pellet as claimed in claim 12 in which the magnesium is alloyed with up to the following proportions of at least one of the following elements: 0.5% Co, 15.0% Al, 5.0% Zn, 5.0% Cu, and 1.0% Ni.

References Cited

UNITED STATES PATENTS

| 3,056,724 | 10/1962 | Marston | 167—53 |
| 3,209,452 | 10/1965 | Schneckenburger | 29—528 |
| 3,146,169 | 8/1964 | Stephenson et al. | 167—82 |

OTHER REFERENCES

Merck Index, Merck and Co. Inc., Rahway, N.J., 1960, p. 625.

The Veterinary Record, vol. 73, pp. 109–110.

SAM ROSEN, Primary Examiner

U.S. Cl. X.R.

424—14, 19, 147, 154